Nov. 25, 1958

E. JACOBITTI ET AL 2,862,072

TRANSLATOR TEST SET

Filed March 24, 1955

FIG. 1
TEST UNIT

| FIG. 6 | FIG. 2 | FIG. 4 |
|---|---|---|
| | FIG. 1 | FIG. 3 |

INVENTORS E. JACOBITTI
D. A. JAMES
BY
C. Mathice

ATTORNEY

Nov. 25, 1958
E. JACOBITTI ET AL
2,862,072
TRANSLATOR TEST SET
Filed March 24, 1955
4 Sheets-Sheet 2
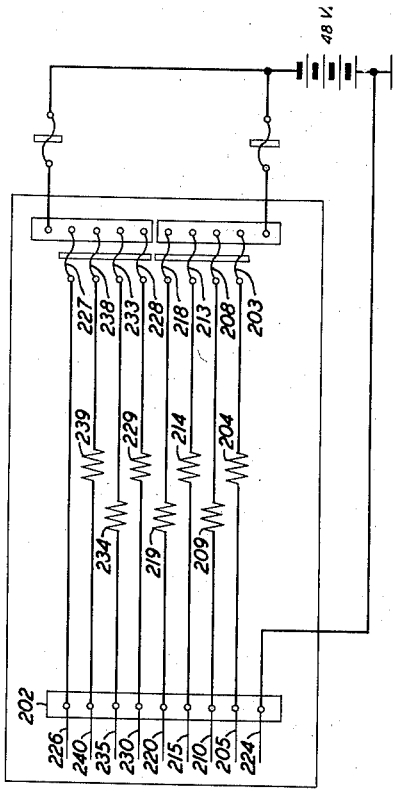
FIG. 2
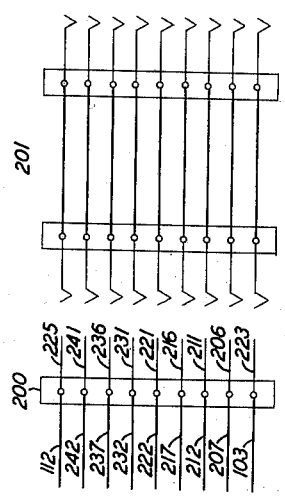
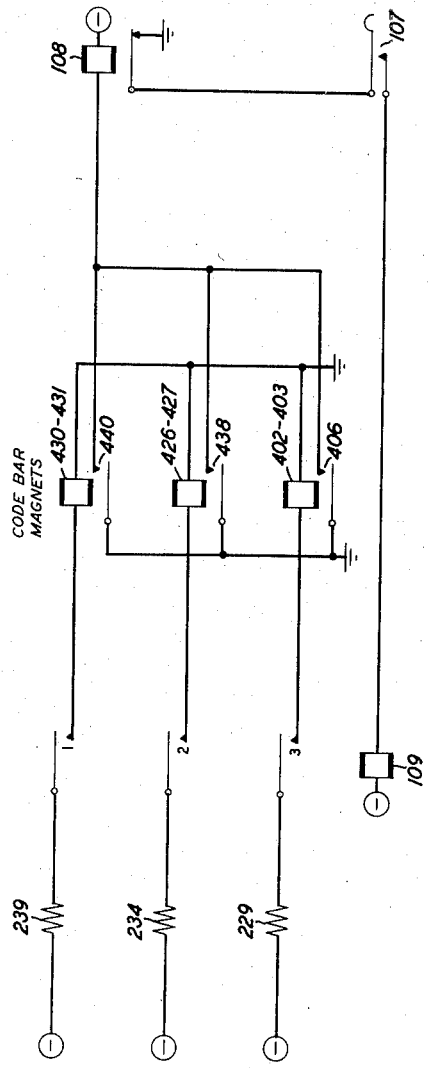
FIG. 5
INVENTORS E. JACOBITTI
D. A. JAMES
BY
C. Mattice
ATTORNEY

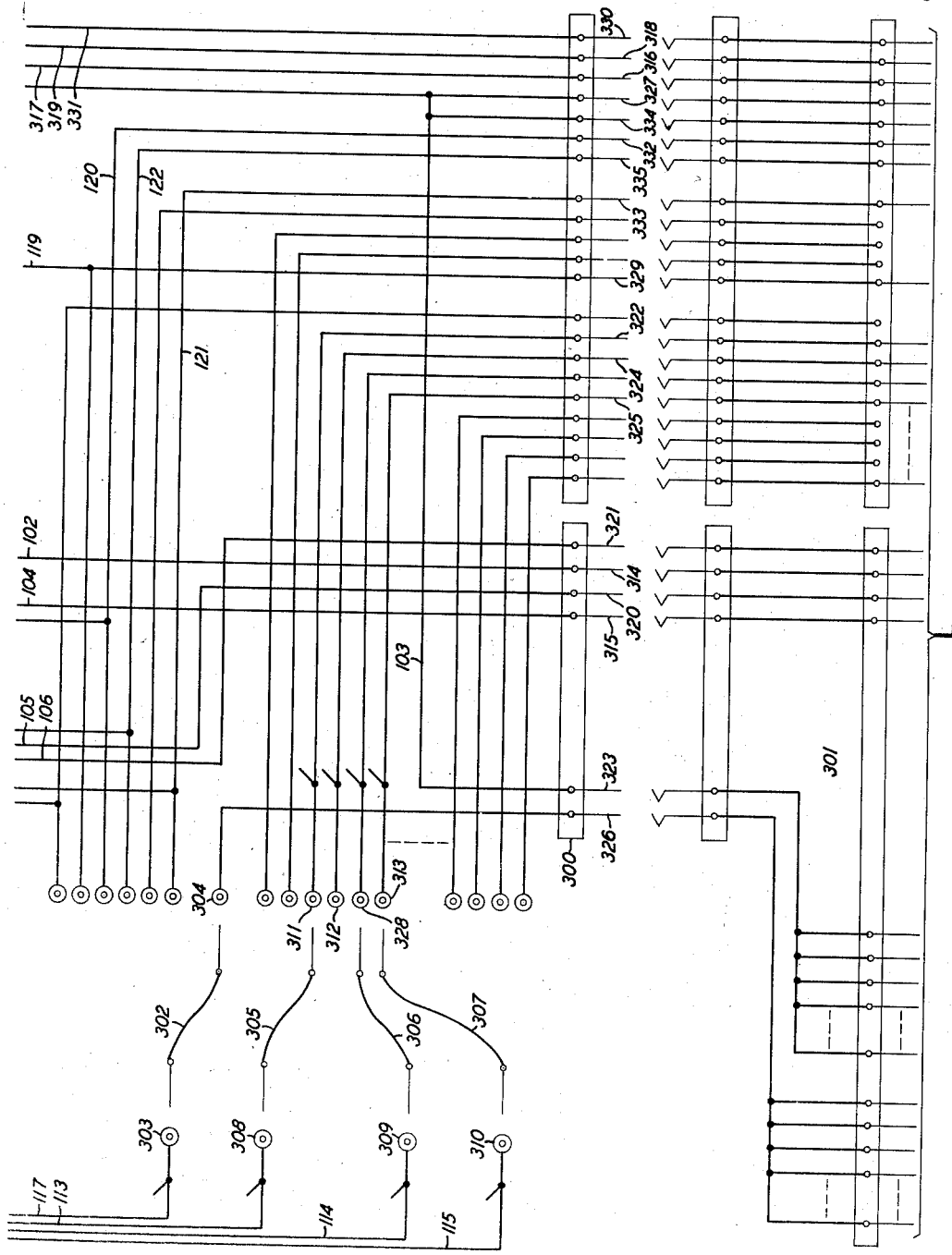

United States Patent Office 2,862,072
Patented Nov. 25, 1958

2,862,072

TRANSLATOR TEST SET

Edward Jacobitti, Newark, and Donald A. James, Union Hill, N. J., assignors to Bell Telephone Laboratories, Incorporated, New York, N. Y., a corporation of New York Application March 24, 1955, Serial No. 496,398

4 Claims. (Cl. 179—175.23)

This invention relates to testing arrangements for telephone equipment and has for one of its objects to facilitate the detection of relative maladjustments in a plurality of apparatus units intended to be operated in synchronism.

A feature of the invention relates to a method and means for testing for faulty adjustment, electromagnetically controlled devices having contacts, by operating a plurality of such devices in a self-determined rhythm, substituting a different device for one of the original plurality and recognizing through a change in the rhythm the identity of a device having faulty adjustment.

More specifically the invention is particularly suitable for testing the code bars of a card translator such as that disclosed and claimed in Patent 2,774,821 to Brown-Hampton-Thiel of December 18, 1956. As described in this patent, the card translator comprises a plurality of perforated cards operatively supported by a set of code bars. Auxiliary means is provided for supporting the cards but these means are withdrawn when a card is to be selected. There are a maximum of 38 code bars which are operated in various combinations in accordance with the information to be translated. Each code bar is controlled by a pair of solenoids which are operated in series and which, when operated, lower the code bar to withdraw its support from the cards. For certain translations nine bars are operated and for other translations 15 bars are operated to cause the desired card to drop. In addition, each code bar has an auxiliary contact which operates a slave relay individual to that bar. These slave relays close a checking path which permits translation to take place. After translation has been completed, all of the operated slave relays must release to free the translator circuit. Therefore, a few code bars which are poorly adjusted may slow up the operation of the translator materially. The code bars, together with certain other equipment, are located in an assembly unit called a selector unit provided with a built-in multiple plug which engages corresponding jacks in the body of the translator and by means of which the circuits for operating the code bar magnets and extending the circuits controlled by the contacts are completed. If it is desired to test or adjust the code bars this selector unit may be removed from the translator.

A feature of the invention is to provide a method and means for connecting a selected plurality of code bar magnets and the associated code bar contacts into a circuit by means of which the code bars are operated in a self-determined rhythm. Means is provided for readily substituting one of the other code bars for one of the selected plurality and detecting from a change in the operating rhythm any code bar which is out of adjustment.

These and other features of the invention will be more clearly understood from a consideration of the following description read in connection with the attached drawing in which:

Fig. 1 shows the relays and keys constituting the test set itself;

Fig. 2 shows the plug and jack connections for supplying battery and ground to the test set;

Fig. 3 shows the plug and jack connections for connecting the test set with the selector unit of the card translator;

Fig. 5 is a simplified showing of the test circuit; and

Fig. 6 shows the manner in which Figs. 1 to 4 are to be arranged.

Figure 4:
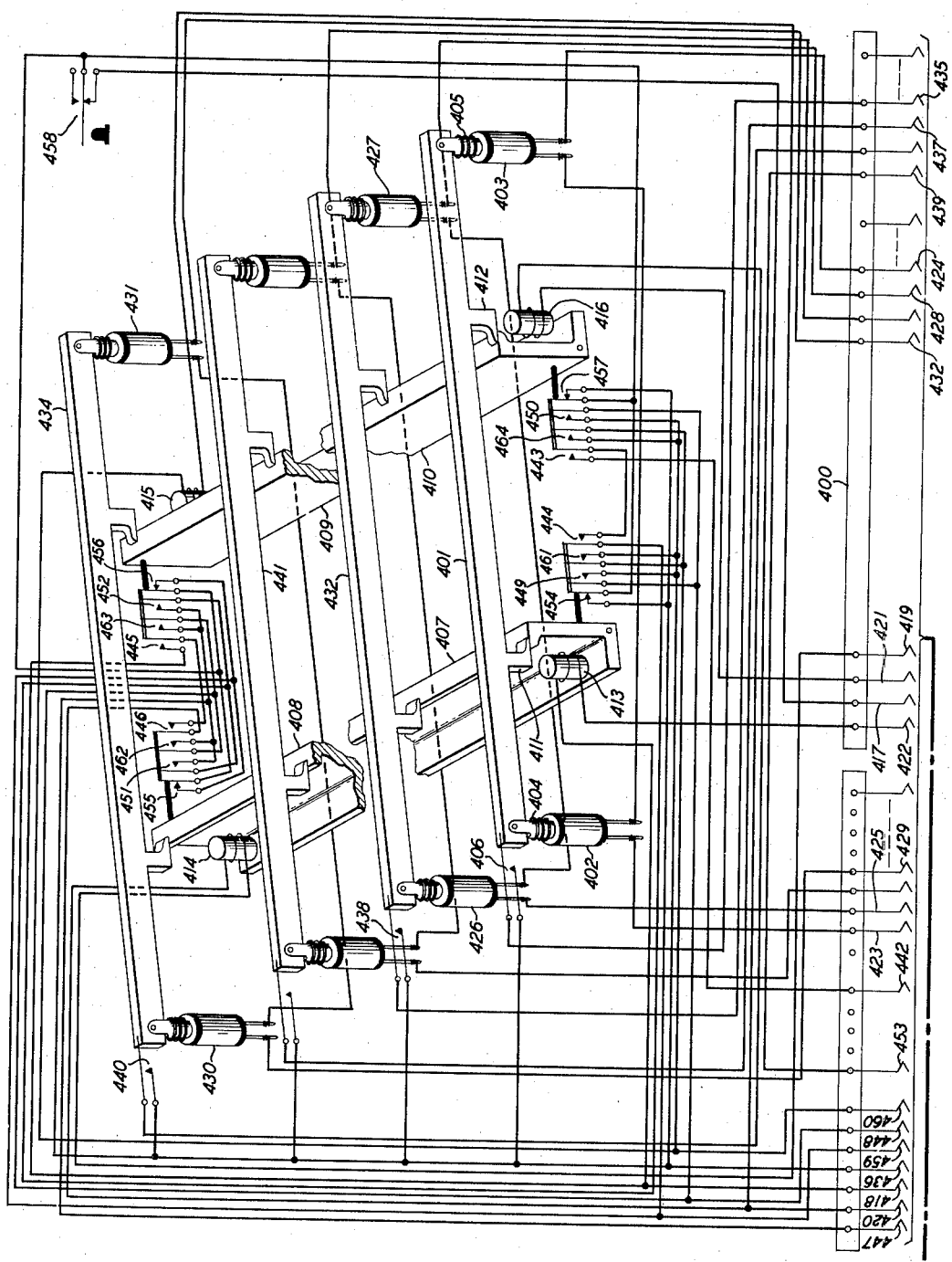
Fig. 4 is a schematic showing of a part of the selector unit.

The test circuit is compactly arranged in a housing mounted on a table. The card translator selector unit, when it has been removed from the card translator, is also placed on an adjustable table and the two units may be moved to a special bench location where the necessary battery and ground supplies are available. In addition to the equipment shown, means is provided for controlling the translator for the insertion or removal of a card, for the removal of the selector unit, as well as means for making current flow tests and timing tests of individual magnets and relays included in the translator.

The test set is provided with conveniently located terminal strips 200 and 300. Terminal strip 200 is connected by means of cord 201 with a frame-mounted terminal strip 202 which furnishes battery and ground to the test set. Terminal strip 300 is connected by means of cord 301 with a multiple jack 400 forming part of the selector unit. Terminal strip 300, cord 301 and jack 400 prepare circuits for the windings of all of the code bar magnets and all of the latch magnets and also prepare circuits including the code bar contacts and the latch magnet contacts. In addition, certain other circuits are provided which are not shown since they do not enter into the invention. Pin jacks are provided for terminating the circuits of all the code bar magnets as well as for other circuits prepared by the connection of the test set with the selector unit. Four other pin jack terminating circuits of the test set and four pin jack cords are provided for connecting the pin jacks together as desired.

As above mentioned, Fig. 4 is a schematic showing of the selector unit. Only four of the 38 code bars are shown and for clearness the bars are shown as rectangular in form. Each code bar, for example, bar 401, is pivotally supported on the extensions of the cores of two solenoid-type magnets 402 and 403, being held in its normal position by means of springs 404 and 405. Magnets 402 and 403 are mounted on a base (not shown) and are wired in series so that they are energized and de-energized simultaneously and are adjusted to lower and release code bar 401 evenly. Code bar 401, when in its normal position, holds open an individual contact 406. To assist in supporting the weight of the cards, a set of four latches 407 to 410 is provided. Code bar 401 has two foot-like projections 411 and 412 which normally rest on latches 407 and 410, as do similar projections on the other code bars. When a translation is to be made, all of the latch magnets 413 to 416 are energized, causing the latches to rotate around their pivotal mounting and to withdraw their support from the code bars. After the code bars corresponding to the code to be translated have been lowered, the latch magnets are de-energized and the latches return to their normal position thereby preventing the inadvertent lowering of an additional code bar. At this time projecting flanges on the latches extend over the toes of the projections on the lowered code bars holding these code bars in their lowered position even after the code bar magnets are de-energized. The top of the flange extends as before under the foot-like projections on the unoperated code bars. Each latch, when operated, closes a set of contacts which control circuits included in the operation of the translator. For a disclosure of the complete card translator and its circuit operation, reference may be made to the above-identified Brown et al. patent.

When the adjustment of the code bars is to be tested the selector unit of the translator is removed in the manner described in the Brown et al. patent and placed adjacent the test set. The test set is then connected with the selector unit by means of cord 301 and with the battery and ground supply by means of cord 201. Pin cord 302 is inserted in pin jacks 303 and 304 and one end of pin cords 305, 306 and 307 are inserted in pin jacks 308, 309 and 310, respectively, to prepare for the test. The other terminals of cords 305, 306 and 307 are then inserted in any three of the pin jacks connected to the windings of code bar magnets. For example, they may be inserted in jacks 311, 312 and 313. It is of course to be understood that there are also pin jacks giving access to all of the other code bar magnets.

Keys 100 and 101 are then operated. With keys 100 and 101 operated, circuits are closed for operating the latch magnets. These circuits can be traced as follows: From battery through fuse 203, resistor 204, terminal 205, through cord 201 to terminal 206, conductor 207, contact 6 of relay 110, contact 10 of relay 111, conductor 102, terminal 314, through cord 301 to terminal 417, winding of latch magnet 415, terminal 418, through cord 301, to terminal 316, conductor 317, contact 1 of key 100, conductor 103, terminal 223, through cord 201 to terminal 224 and ground; from battery through fuse 208, resistor 209, terminal 210, through cord 201 to terminal 211, conductor 212, contact 7 of relay 110, contact 8 of relay 111, conductor 104, terminal 315, through cord 301, to terminal 419, winding of latch magnet 414, terminal 420, through cord 301, to terminal 318, conductor 319, contact 1 of key 101, conductor 103 to ground as above traced; from battery through fuse 213, resistor 214, terminal 215, through cord 201 to terminal 216, conductor 217, contact 2 of relay 110, contact 4 of relay 111, conductor 105, terminal 320, through cord 301 to terminal 421, winding of latch magnet 416, terminal 420, and thence to ground as previously traced; from battery through fuse 218, resistor 219, terminal 220, through cord 201, to terminal 221, conductor 222, contact 1 of relay 110, contact 2 of relay 111, conductor 106, terminal 321, through cord 301 to terminal 422, winding of latch magnet 413, terminal 418, and thence to ground as previously traced. Magnets 413 to 416 operate in these circuits, withdrawing their associated latches to permit the code bars to move freely.

Key 107 is now operated to start the rhythm test. When key 107 is operated, a circuit is closed from ground on conductor 103, contacts 3 of keys 100 and 101, contact 5 of relay 108, contact 1 of key 107, winding of relay 109, conductor 112, terminal 225, through cord 201 to terminal 226, fuse 227 to battery. Relay 109 operates in this circuit and closes circuits for energizing the three sets of code bar magnets selected by the insertion of pin cords 305, 306 and 307 in the corresponding pin jacks. These circuits may be traced as follows:

From battery through fuse 228, resistor 229, terminal 230, through cord 201 to terminal 231, conductor 232, contact 3 of relay 109, conductor 113, pin jack 308, cord 305, pin jack 311, terminal 322, through cord 301 to terminal 423, windings of code bar magnets 402 and 403, terminal 424, through cord 301 to terminal 323, conductor 103 to ground as previously traced; from battery through fuse 233, resistor 234, terminal 235, through cord 201 to terminal 236, conductor 237, contact 2 of relay 109, conductor 114, pin jack 309, cord 306, pin jack 312, terminal 324, through cord 301 to terminal 425, windings of code bar magnets 426 and 427, terminal 428, through cord 301 to terminal 323 and ground; from battery through fuse 238, resistor 239, terminal 240, through cord 201 to terminal 241, conductor 242, contact 1 of relay 109, conductor 115, pin jack 310, cord 307, pin jack 313, terminal 325, through cord 301 to terminal 429, windings of code bar magnets 430 and 431, terminal 432, through cord 301 to terminal 323 and ground. It will be noted that the ground connections to the code bar magnets are multipled together within the cord 301.

Magnets 402, 403, 426, 427, 430 and 31 are energized in this circuit and attract their cores thereby lowering code bars 401, 433 and 434. When at least one of the code bars is lowered sufficiently to permit its contact to close, for example, contact 406 associated with code bar 401, a circuit is completed from battery through fuse 227, terminal 226, through cord 201 to terminal 225, conductor 112, resistor 116, upper winding of relay 108, contact 4 of relay 110, contact 4 of key 107, conductor 117, pin jack 303, cord 302, pin jack 304, terminal 326, through cord 301 to terminal 435, contact 406, terminal 436, through cord 301, terminal 327, to ground on conductor 103. Parallel circuits for the winding of relay 108 may be traced from terminal 326, through cord 301, to terminals 437 and 439, which are connected over contacts 438 and 440, associated, respectively, with code bars 433 and 434 to terminal 436.

As soon as one of these parallel circuits is closed, relay 108 operates, opening at its contact 5 the operating circuit for relay 109 previously traced. Relay 109 thereupon releases, opening the operating circuits for the code bar magnets 402, 403, 426, 427, 430 and 431 causing them to de-energize and permit code bars 401, 433 and 434 to restore under spring control. The circuit of relay 108 remains closed until the last of the code bars is restored to normal, at which time relay 108 releases, reclosing the circuit for relay 109. With relay 109 operated, the code bar magnets are again energized and the cycle continues in a rhythm determined by the mechanical adjustment of the code bars. When the rhythm is well established the person making the test may withdraw one of the cords 305, 306 and 307 from the pin jack associated with one of the code bars and insert it in the pin jack associated with another code bar. For example, cord 306 may be withdrawn from jack 312 associated with code bar 433 and inserted in jack 328 associated with code bar 441.

If the rhythm remains unchanged both when the cord 306 is withdrawn from jack 312 and when it is inserted in jack 328, cords 305 and 307 may be similarly transferred to other jacks and the process continued until the operation of all the code bars has been observed. If one of the code bars is out of adjustment so that it does not respond smoothly and promptly to the energization and de-energization of its code bar magnets, the rhythm will be noticeably slowed down when these magnets are included in the group being operated and the rhythm will noticeably increase when the operating circuit is transferred to the magnets of another well adjusted code bar.

Fig. 5 is a simplified diagram of the circuit for making this rhythm test. The same reference characteristics have been applied to this circuit diagram as employed in the main drawing for the initial stage of the test to facilitate the identification of the various elements.

This test set is also arranged to test the code bars in cooperation with the latches in a conventional cycle, to detect faulty relative adjustment and timing between the latches and code bars.

For this test, cord 302 is inserted in jacks 303 and 304 and cords 305 to 307 are used to connect jacks 308 to 310 with any desired code bar magnets by inserting them in the corresponding pin jacks. For convenience it will be assumed that they are inserted in jacks 311, 312 and 313. Test keys 100, 101 and 107 are left normal and key 118 is closed. Under this condition, as shown as key 118 is operated, circuits are closed for the latch magnets, the circuits for magnets 413 and 415 extending as previously traced from battery over back contacts of relays 110 and 111, through the windings of the latch magnets to terminal 316 and conductor 317 and thence over contact 2 of key 100, contact 2 of key 118, to ground on conductor 103 and the circuits for latch magnets 414 and 416 extending as previously traced from battery over back contacts of relays 110 and 111, through the windings of the magnets to terminal 318 and conductor 319 and thence over contact 2 of key 101, contact 2 of key 118 to ground on conductor 103.

Each latch magnet rotates its associated latch, withdrawing the flange from under all code bars. In addition, each latch magnet closes its corresponding set of contacts so that, with all of the latch magnets 413 to 416 operated, a circuit is closed from battery connected to conductor 112, as previously described, winding of relay 109, contact 3 of key 118, conductor 119, terminal 329, through cord 301 to terminal 442, latch contact 443 associated with latch 410 and magnet 416, latch contact 444 associated with latch 407 and magnet 413, latch contact 445 associated with latch 409 and magnet 415, latch contact 446 associated with latch 408 and magnet 414, terminal 447, through cord 301 to terminal 330, conductor 331, contact 1 of relay 111, to ground on conductor 103. Relay 109 operates in this circuit.

With relay 109 operated the previously traced circuits for code bar magnets 402, 403, 426, 427, 430, and 431 are closed and code bars 401, 433 and 434 are lowered, causing their associated contacts 406, 438 and 440 to close. When any one of these contacts closes, for example contact 406, a circuit is completed from ground on conductor 103, terminal 327, through cord 301 to terminal 436, contact 406, terminal 435, through cord 301 to terminal 326, pin jack 304, cord 302, pin jack 303, conductor 117, contact 3 of key 107, contact 4 of key 118, winding of relay 110, conductor 112, and thence to battery as previously traced. Parallel circuits are closed for relay 110 over contacts 438 and 440. Relay 110 operates, opening at its contacts 1, 2, 6 and 7 the circuits for latch magnets 413 to 416 causing the latches to return to position for holding the code bars in this lowered position.

As soon as one latch releases, it opens the operating circuit for relay 109 but relay 109 is held operated at this time in a circuit which may be traced from battery through the winding of relay 109, contact 3 of key 118, conductor 119, contact 3 of relay 110, contact 1 of relay 111, to ground at conductor 103. When the latch contact is completely released, it closes a supplementary locking circuit for that relay which may be traced from battery on conductor 112, winding and contact 5 of relay 109, conductor 121, terminal 333, through cord 301 to terminal 453, selector removal contact 458, which is closed whenever the selector unit has been withdrawn from the card translator, the closed one of latch contacts 454 to 457, terminal 459, through cord 301 to terminal 334, and ground on conductor 103. This circuit is closed in parallel over the remaining ones of contacts 454 to 457 as they close.

When key 118 was operated, a circuit was closed from battery, connected to conductor 112 as above traced, through resistor 116, upper winding of relay 108, contact 1 of key 118, to ground at conductor 103. However, this winding of relay 108 is initially shunted by a circuit extending over contact 4 of relay 110 and contact 5 of key 107. When the latch contact release, as above described, a second shunt is closed extending from the battery side of the winding of relay 108, over contact 2 of key 107, contact 11 of relay 111, conductor 120, terminal 332, through cord 301, terminal 448, in parallel over contacts 449 to 452 of the four latches to terminal 436 through cord 301, terminal 327, to ground on conductor 103. When relay 110 operates in response to the closure of the first code bar contact, one of these shunts is opened and when the last of the latch magnets is released the other shunt is opened. Relay 108 thereupon operates, completing a closed loop circuit through its lower winding extending over its contact 6 through adjustable resistance 123 and contact 6 of key 107, to render the relay slow to release. The timing of this slow release action may be varied as desired by adjusting resistance 123. With relays 110 and 108 both operated, a circuit is closed from battery on conductor 112 through the winding of relay 111, contact 5 of relay 110, contact 7 of relay 108 to ground on conductor 103. Relay 111 operates and closes circuits for reoperating the latch magnets. These circuits may be traced as follows: From battery on conductor 207, contact 4 of relay 108, contact 9 of relay 111, conductor 102, terminal 314, through cord 301 to terminal 417, winding of latch magnet 415 and thence to ground as previously traced; from battery on conductor 212, contact 3 of relay 108, contact 7 of relay 111, conductor 104, terminal 315, through cord 301 to terminal 419, winding of latch magnet 414 and thence to ground; from battery on conductor 217, contact 2 of relay 108, contact 5 of relay 111, conductor 105, terminal 320, through the cord 301 to terminal 421, winding of latch magnet 416 and thence to ground; from battery on conductor 222, contact 1 of relay 108, contact 3 of relay 111, conductor 106, terminal 321, through cord 301 to terminal 422, winding of latch magnet 413 and thence to ground. The latch magnets now operate, opening the locking circuit of relay 109 and closing a locking circuit for relay 111, which extends over contact 6 of relay 111, conductor 122, terminal 335, through the cord 301, terminal 460, in parallel over latch magnet contacts 461 to 464, terminal 436, through cord 301, terminal 327 to ground the conductor 103. With relay 111 held operated, the operating ground for relay 109 is opened and, with the latch magnets operaed, the locking circuit for relay 109 is also opened, and relay 109 releases, in turn releasing the operated code bar magnets. When the last code bar opens it contact, relay 110 releases, reclosing the one shunt around the upper winding of relay 108. The second shunt previously traced is opened at contact 11 of relay 111. With both windings of relay 108 shunted, this relay releases slowly to permit the code bars to stop bouncing before the relay 108 opens its contacts to release the latch magnets. When relay 108 finally releases, the latch magnets release, opening the locking circuit for relay 111, restoring the test circuit to condition to start a new cycle. If the selected code bars are out of adjustment with respect to the latch bars or any of the latch contacts are out of adjustment, the cycle above-described will be blocked.

What is claimed is:

1. A testing circuit for testing apparatus which includes a plurality of similar electromagnetic devices each device having a winding and a contact, comprising manually controlled means for selecting a small number of said devices, means for repeatedly operating and releasing said devices under the control of said contacts whereby said devices operate in a self-determined rhythm, said manually controlled means operable to substitute other devices for said selected devices one at a time to detect faulty adjustment of said devices by alteration in the rhythm of operation.

2. A testing circuit for testing apparatus which includes a plurality of similar electromagnetic devices each device having a winding and a contact, comprising manually controlled means for selecting a small number of said devices, operating means for causing said small number of said devices to close their contacts, release means responsive to the closure of any one of said contacts for releasing said operating means, the release of said operating means causing said small number of devices to open their contacts, and means responsive to the opening of all of said contacts to release said release means, the release of said release means effective to reoperate said operating means whereby said devices operate in a self-determined rhythm, said manually controlled means operable to substitute other devices for said selected devices one at a time to detect faulty adjustment of said devices by alteration in the rhythm of operation.

3. A testing circuit for testing a card translator which includes a plurality of code bars, magnets individual to said code bars for moving said code bars and contacts individual to each code bar, comprising manually controlled means for selecting a small number of said code bars, means for repeatedly energizing and de-energizing the magnets indivdual to the selected code bars under the control of said individual contacts whereby said code bars move in a self-determined rhythm, said manually controlled means operable to substitute other code bars for said selected code bars one at a time to detect faulty adjustment of said code bars by alteration in the rhythm of movement.

4. A testing circuit for testing a card translator which includes a plurality of code bars, magnets individual to said code bars for moving said code bars and contacts individual to each code bar, comprising manually controlled means for selecting a small number of said code bars, operating means for energizing the magnets controlling said small number of said code bars to cause said code bars to close their contacts, release mans responsive to the closure of any one of said contacts for releasing said operating means, the release of said operating means causing said small number of code bars to open their contacts, means responsive to the opening of all of said contacts to release said release means, the release of said release means effective to reoperate said operating means whereby said code bars move in a self-determined rhythm, said manually controlled means operable to substitute other code bars for said selected code bars one at a time to detect faulty adjustment of said code bars by alteration in the rythm of movement.

No references cited.